United States Patent [19]
Ekeroth et al.

[11] Patent Number: 5,268,944
[45] Date of Patent: Dec. 7, 1993

[54] NUCLEAR REACTOR HAVING A POLYHEDRAL PRIMARY SHIELD AND REMOVABLE VESSEL INSULATION

[75] Inventors: Douglas E. Ekeroth, Delmont; Richard Orr, Pittsburgh, both of Pa.

[73] Assignee: Westinghouse Electric Corp., Pittsburgh, Pa.

[21] Appl. No.: 903,638

[22] Filed: Jun. 24, 1992

[51] Int. Cl.$^5$ ............................................. G21C 11/08
[52] U.S. Cl. ................................... 376/289; 376/461; 376/254
[58] Field of Search ............... 376/287, 289, 293, 461, 376/347, 254

[56] References Cited

U.S. PATENT DOCUMENTS

| | | | |
|---|---|---|---|
| 3,881,288 | 5/1975 | Fay | 376/289 |
| 3,928,133 | 12/1975 | Schabert et al. | 376/289 |
| 3,974,027 | 8/1976 | Michel | 376/289 |
| 4,115,194 | 9/1978 | Butti | 376/461 |
| 4,279,701 | 7/1981 | Ebata et al. | 376/289 |
| 4,292,134 | 9/1981 | Eriksson | 376/289 |
| 4,293,386 | 10/1981 | Harand et al. | 376/461 |
| 4,330,367 | 5/1982 | Musick | 376/254 |
| 4,639,349 | 1/1987 | Baratta et al. | 376/254 |
| 4,797,247 | 1/1989 | Blaushild et al. | 376/289 |
| 4,844,858 | 7/1989 | Fero et al. | 376/254 |

Primary Examiner—Daniel D. Wasil
Attorney, Agent, or Firm—J. C. Valentine

[57] ABSTRACT

A nuclear reactor is provided having a generally cylindrical reactor vessel disposed within an opening in a primary shield. The opening in the primary shield is defined by a plurality of generally planar side walls forming a generally polyhedral-shaped opening. The reactor vessel is supported within the opening in the primary shield by reactor vessel supports which are in communication and aligned with central portions of some of the side walls. The reactor vessel is connected to the central portions of the reactor vessel supports. A thermal insulation polyhedron formed from a plurality of slidably insertable and removable generally planar insulation panels substantially surrounds at least a portion of the reactor vessel and is disposed between the reactor vessel and the side walls of the primary shield. The shape of the insulation polyhedron generally corresponds to the shape of the opening in the primary shield. Reactor monitoring instrumentation may be mounted in the corners of the opening in the primary shield between the side walls and the reactor vessel such that insulation is not disposed between the instrumentation and the reactor vessel.

10 Claims, 4 Drawing Sheets

NUCLEAR REACTOR HAVING A POLYHEDRAL PRIMARY SHIELD AND REMOVABLE VESSEL INSULATION

GOVERNMENT CONTRACT

The Government of the United States of America has rights in this invention pursuant to Contract No. DE-AC03-90SF18495 awarded by the Department of Energy.

BACKGROUND OF THE INVENTION

This invention relates to nuclear reactors, and, more particularly, to insulating and shielding the reactor vessels of such reactors.

It is standard practice for the reactor vessels of nuclear reactors to be surrounded by a primary shield which assists in shielding the area surrounding the vessel from radiation emitted from the reactor vessel. Typically, there is a small amount of space, or volume, between the reactor vessel and the inner wall of the primary shield. The size of the space depends upon the size of the gap between the reactor vessel and the primary shield. Primary shields have traditionally been made of concrete. The designs or configurations of primary shields have typically been controlled by the amount of radiation shielding which must be maintained. The high temperatures associated with the reactor vessel during operation, typically on the order of 500° to 600° F. may result in deterioration of the portion of the primary shield adjacent to the reactor vessel. To lessen the likelihood of deterioration of the primary shield, it is desirable to keep the temperature thereof from exceeding about 150° to 200° F. Accordingly, it is necessary to thermally insulate the reactor vessel from the primary shield.

Traditionally, the reactor vessel is disposed within a generally cylindrical opening in the primary shield with approximately a 6 to 10 inch annulus, or gap, between the reactor vessel and the primary shield. The reactor vessel insulation has typically been attached directly to the reactor vessel during construction of the reactor facility. Subsequent removal or replacement of the insulation has been very difficult and time consuming because of the limited amount of space between the reactor vessel and the primary shield. It has been known to increase the size of the gap between the cylindrical reactor vessel and the cylindrical primary shield to increase the amount of space therebetween, and thereby enhance accessibility of the insulation. However, this approach has proven to be an unsatisfactory solution because it requires increasing the distance which must be spanned by the reactor vessel supports which support the reactor vessel in the primary shield.

It would also be desirable to increase the amount of space between the primary shield and the reactor vessel in order to provide more space for external reactor monitoring instruments, such as excore detectors. In existing reactors, such detectors are positioned within the space between the reactor and the primary shield, or within the concrete of the primary shield. With either of these types of excore detector installation, the reactor vessel insulation is disposed between the reactor vessel and the excore detectors. The presence of such insulation may adversely affect the operational performance of the excore detectors because the strength of the signal being monitored by the excore detectors may be reduced by the signal's passage through the insulation.

There is a need for a nuclear reactor wherein additional space is provided between the reactor vessel and primary shield for installation, removal and maintenance of the reactor vessel insulation, and for accommodation of and improved access to reactor monitoring instrumentation, but which does not require the reactor vessel supports to span increased distance, or gap, to accommodate such increased space.

SUMMARY OF THE INVENTION

The present invention includes a primary shield having a plurality of generally planar vertically disposed internal side walls defining a polyhedral-shaped opening therein. The reactor core is disposed within a generally cylindrical reactor vessel having a generally hemispherical lower end. The reactor vessel is supported within the opening in the primary shield such that the primary shield substantially surrounds the region of the reactor vessel wherein the core is located.

Reactor vessel supports hold the reactor vessel in place within the opening in the primary shield. The reactor vessel supports are aligned with and supported by at least a central portion of at least some of the planar side walls of the primary shield. The reactor vessel is secured to the reactor vessel at or near the regions where the cold legs attach to the reactor vessel.

Generally planar panels of reactor vessel thermal insulation surround a lower portion of the reactor vessel wherein the core is disposed. The insulation panels form an insulation polyhedron, the shape of which may generally correspond to the shape of the polyhedral opening in the primary shield. The insulation polyhedron includes a plurality of generally rectangular side panels each of which is oriented generally parallel to a side wall of the primary shield. In addition, the longitudinal axis of each side panel is generally parallel to the longitudinal axis of the reactor vessel. The long sides of each panel abut the adjacent long sides of adjacent panels to form a polyhedron. Corners having generally obtuse angles are formed where the panels abut one another.

A generally planar central panel may be centrally disposed below the hemispherical portion of the reactor vessel and below the lower ends of the side panels. The central panel is oriented generally perpendicular to the side panels. The central panel preferably has a shape substantially similar, but smaller, than the cross-sectional shape of the polyhedron bounded by the side panels. A plurality of generally planar connecting panels may connect the linear edges of the central panel to the bottom edges of each side panel, such that substantially the entire lower portion of the reactor vessel is surrounded by a continuous layer of insulation. Alternate embodiments include the use of connecting panels without a central panel, and the use of a central panel without connecting panels.

The insulation panels may be removably connected to the side walls of the primary shield, to the reactor vessel, to instrumentation mounted within the area between the reactor vessel and the primary shield, or to any combination thereof.

The increased space between the reactor vessel and the primary shield resulting from the polyhedral shape of the primary shield improves accessibility to that area for installation, removal and maintenance of the insulation and instrumentation disposed therein.

Reactor monitoring instrumentation, such as excore detectors, may be positioned in one or more corners formed where the side walls of the primary shield meet. Positioning the detectors in the corners permits them to be positioned directly adjacent to the reactor vessel without insulation disposed therebetween.

Reactor vessel supports are provided for supporting the reactor vessel in the opening in the primary shield. At least four vessel supports are generally equally spaced around the circumference of the reactor vessel. The reactor vessel engages each vessel support at a central portion thereof which is generally aligned with a central portion of a side wall of the primary shield, where the primary shield is closest to the reactor vessel. Positioning the reactor vessel supports such that they are engaged by the reactor vessel in locations near the central portions of the side walls enables the amount of space between the reactor vessel and the primary shield to be increased without increasing the distance, or gap, which must be spanned to support the reactor.

It is an object of this invention to provide a nuclear reactor having increased space between the reactor vessel and primary shield which does not require an increase in the distance spanned by the reactor vessel supports to accommodate such an increased space.

It is a further object of this invention to provide a nuclear reactor in which reactor vessel insulation and instrumentation disposed within the space between the reactor vessel and the primary shield are more easily accessible for installation, removal and maintenance thereof.

It is another object of this invention to provide a nuclear reactor in which excore detectors, and other reactor monitoring instrumentation, may be positioned directly adjacent to the exterior of the reactor vessel without insulation being disposed therebetween.

It is yet another object of this invention to provide a nuclear reactor wherein one or more sections of reactor vessel insulation are easily removable for maintenance and/or replacement.

These and other objects of the present invention will be more fully understood from the following description of the preferred embodiment of the invention with reference to the drawings appended hereto.

DESCRIPTION OF THE PREFERRED EMBODIMENT

Figure 1:
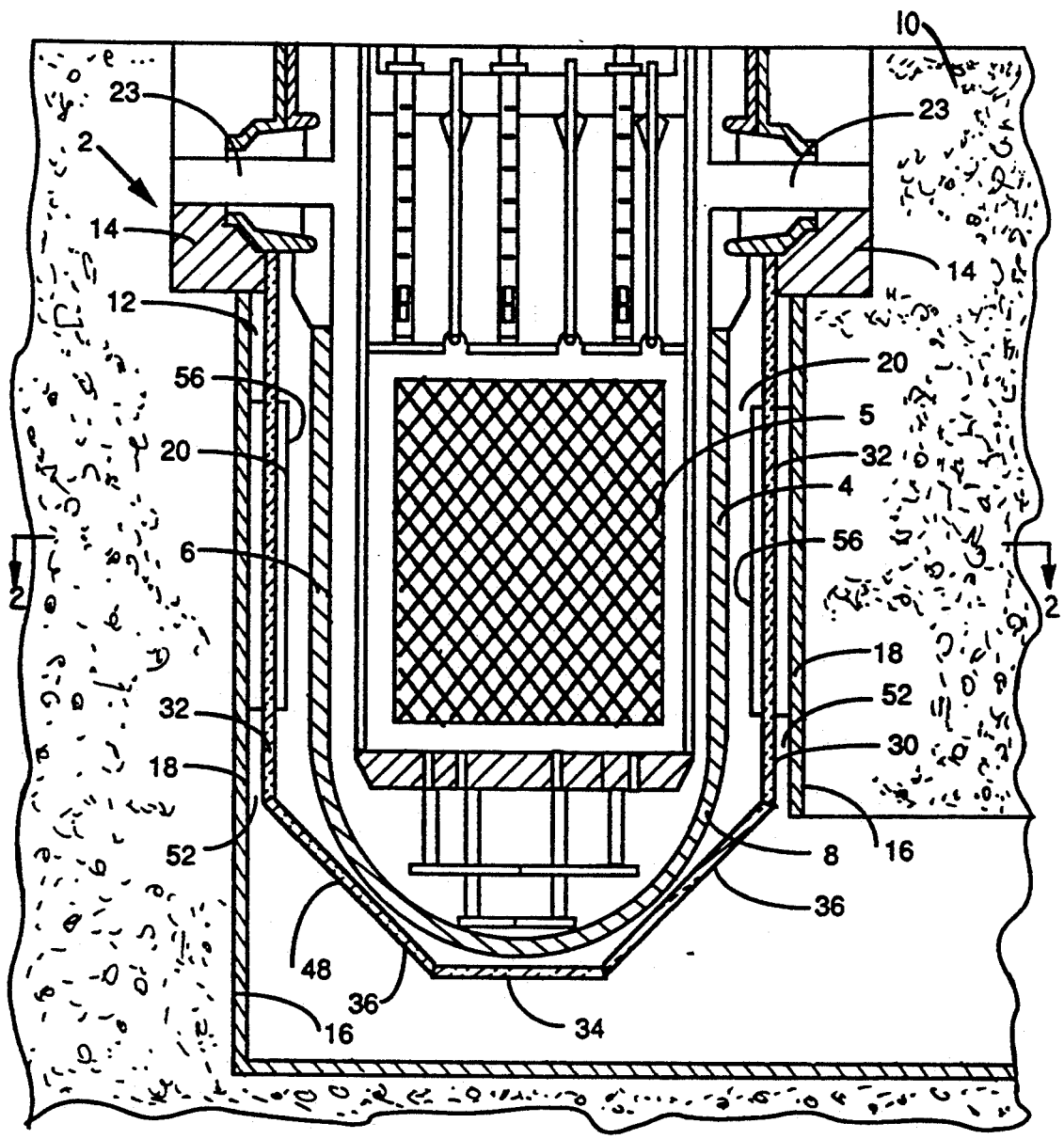
FIG. 1. is a longitudinal sectional view through a lower part of a nuclear reactor showing an embodiment of the present invention.
Figure 2:
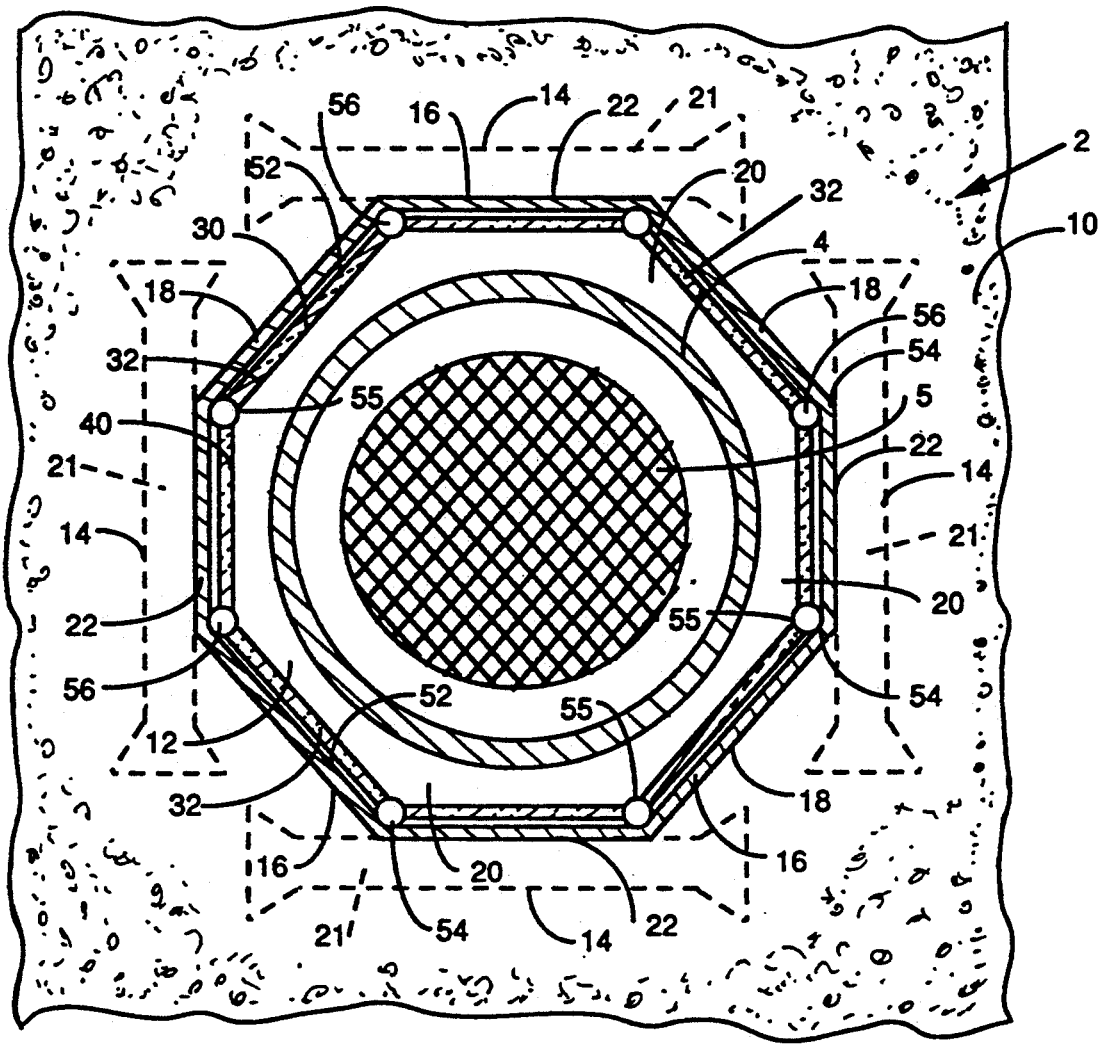
FIG. 2 is a cross-sectional view of the reactor taken along line 2—2 of FIG. 1.
Figure 3:
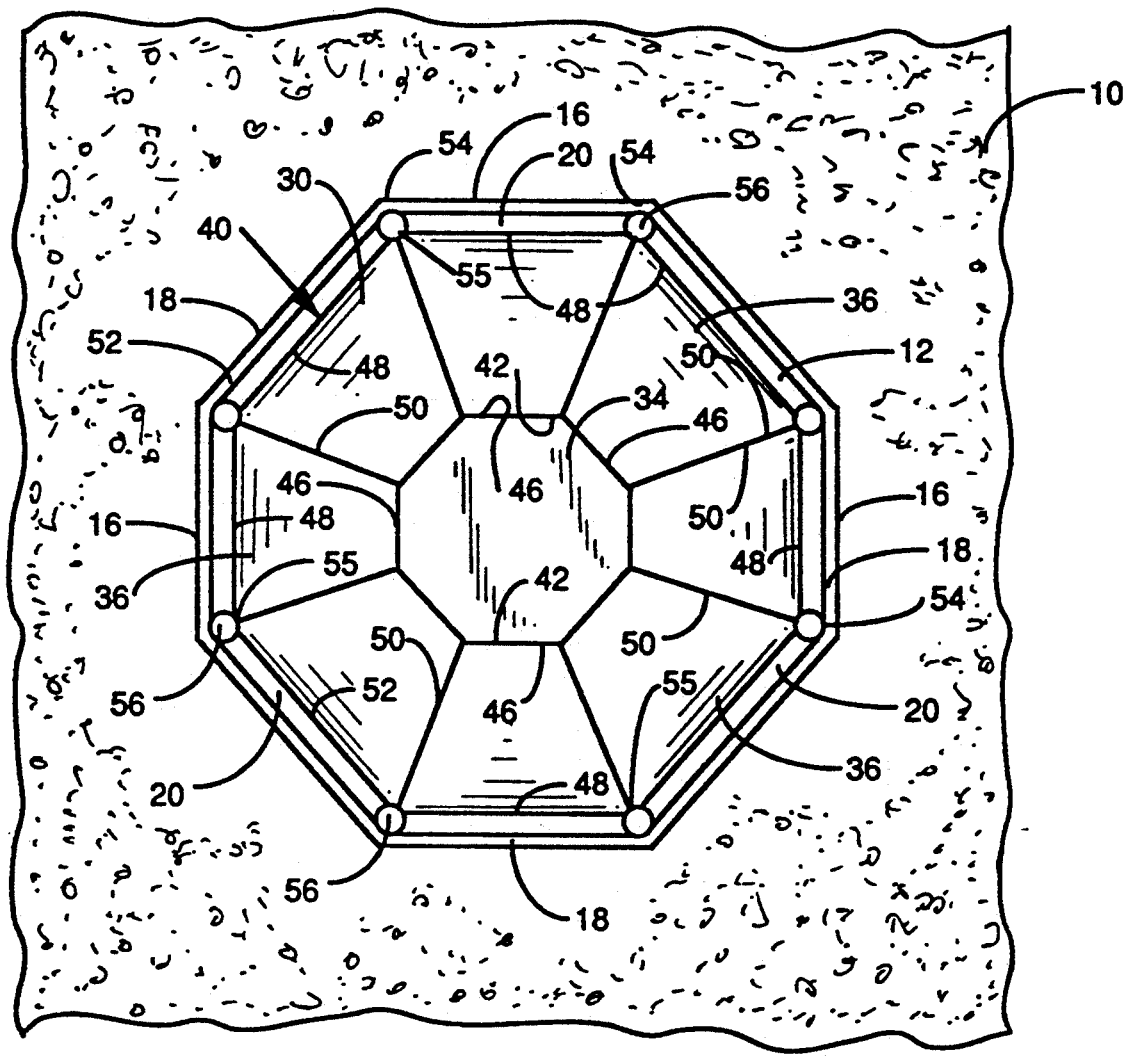
FIG. 3 is a bottom view of the nuclear reactor.

Referring to FIGS. 1 and 2, there is shown a nuclear reactor 2 in which this invention is used. Reactor 2 includes reactor vessel 4, inside of which reactor core 5 is located. Reactor vessel 4 has a generally cylindrical portion 6 and a generally hemispherical lower end 8. Reactor vessel 4 is disposed within a primary shield 10.

Primary shield 10 is preferably a concrete structure which surrounds at least a lower portion of reactor vessel 4. Primary shield 10 has an opening 12 therein in which reactor vessel 4 is positioned. Reactor vessel supports 14 hold vessel 4 in place within opening 12.

Opening 12 is defined by a plurality of generally planar interior side walls 16 which generally form a polyhedron. In a preferred embodiment, eight side walls 16 are provided, whereby opening 12 is octagonal in cross-section. It will be appreciated, however, that any suitable polygonal cross-sectional shape may be utilized.

In a preferred embodiment, a plurality of steel plates 18 may cover the exterior surface of side walls 16. Steel plates may be provided as the forms for pouring the concrete portion of primary shield 10. Plates 18 do not have to be removed from the exposed walls after the concrete dries. Steel plates 18 may be secured to side walls 16 using any suitable means in a manner known to those skilled in the art. It will be appreciated that the use of generally planar side walls 16 will simplify construction of primary shield 10 over existing cylindrical designs since no curved portions need be formed in either the concrete structure or steel plates 18.

Variable sized gap 20 between cylindrical reactor vessel 4 and polyhedral shaped opening 12 results in an increase in the amount of space between vessel 4 and side walls 16. The increased space permits improved access to the area between vessel 4 and side walls 16 for maintenance, inspection and other purposes. With existing designs, increasing the amount of space between the cylindrical vessel and the cylindrical side walls of the opening in the primary core required an increase in the size of gap between the vessel and the side walls, which in turn, resulted in an increase in the distance spanned by vessel supports 14 to support the reactor vessel in the primary shield. As discussed below, the use of polyhedral-shaped opening 12 permits the space between reactor vessel 4 and side walls 16 of primary shield 10 to be increased substantially over that which can be achieved using existing cylindrical designs, without requiring an increase in the distance spanned by vessel supports 14. It should be noted that because of the increased amount of space between reactor vessel 4 and primary shield 10, it may be desirable to install additional shielding to at least partially cover gap 20 at the top portion of primary shield 10 to further shield the surrounding area from radiation.

Preferably, four or more vessel supports 14 are provided substantially equally spaced about the circumference of vessel 4. Each vessel support 14 is preferably in communication with and at least partially supported by an upper portion of a side wall 16. The ends of each vessel support 14 preferably extend into the concrete of primary shield 10 and are thereby secured in place. Reactor vessel 4 engages and is supported by at least a central portion 21 of each vessel support 14. In a preferred embodiment, reactor vessel supports 14 engage vessel 4 at locations at or adjacent to the locations where cold leg 23 enters vessel 4.

In a preferred embodiment, each vessel support 14 is located such that a central portion 21 of each vessel support 14 is aligned with a central portion 22 of one of the planar side walls 16 of primary shield 10. Central portion 22 is the portion of each side wall 16 which is the closest to reactor vessel 4. In a preferred embodiment, the distance between reactor vessel 4 and each side wall 16 at central portion 22 is substantially equal to the typical distance between the reactor vessel and the cylindrical side walls of the primary shield of existing designs. At least part of central portion 21 of each vessel support 14 may be positioned on and supported by the top of the central portion 22 of the side wall 16 with which it is associated. Accordingly, the distance spanned by reactor vessel supports 14 in the present invention would be substantially equal to or less than the distance spanned by vessel supports in existing cylindrical designs. Yet it will be appreciated that because of the polyhedral shape of the opening 12 in primary shield 10, the total amount of space between vessel 4 and side walls 16 is greater in the present invention than would be available in existing cylindrical designs having the same vessel support span distance.

Referring to FIGS. 1 through 4, as discussed hereinabove, it is desirable to provide thermal insulation 30 between reactor vessel 4 and primary shield 10. In a preferred embodiment, the type of insulation used is a stainless steel reflective insulation. This type of insulation consists of a plurality of stainless sheets stacked upon one another to form a desired thickness. The thickness of the insulation is preferably about 2 to 6 inches. Each sheet has a reflective surface thereon. The sheets are separated by air gaps. The insulation is positioned such that the reflective surfaces of the stainless steel sheets are oriented to reflect the heat radiated from reactor vessel 4 back toward vessel 4. While this type of insulation is used in the preferred embodiment, it will be appreciated that any suitable type of insulation may be used with this invention.

In a preferred embodiment, insulation 30 includes a plurality of generally planar panels 32, 34, 36 of insulation. Side panels 32 are preferably generally rectangular in shape and are positioned around the circumference of a portion of reactor vessel 4 within gap 20. The long sides 38 of side panels 32 are in communication with adjacent long sides 38 of adjacent panels 32 to form an insulation polyhedron 40 preferably having a cross-sectional shape substantially similar to, but smaller than, the cross-sectional shape of opening 12 in primary shield 10. In a preferred embodiment, eight side panels 32 are provided and the cross-sectional shape of polyhedron 40 formed thereby is octagonal.

A central panel 34 is positioned below a central portion of generally hemispherical portion 8 of vessel 4 and below the lower edges 44 of side panels 32. The shape of central panel 34 is preferably substantially similar to the cross-sectional shape of polyhedron 40 at side panels 32, but is significantly smaller than insulation polyhedron 40. In a preferred embodiment, the area of central panel 34 is about 0 to 100 percent of the cross-sectional area of insulation polyhedron 40 at side panels 32. Central portion 34 is oriented such that each generally linear edge 42 thereof is disposed generally parallel to the transverse axis of one of side panels 32. It will be appreciated that if the cross-sectional area of central panel 34 is equal to 100 percent of the cross-sectional area of insulation polyhedron 40 then edges 42 of central panel 34 will abut the lower edge 44 of a side panel 32 and no connecting panels 36 are provided.

A plurality of generally planar connecting panels 36 connect each edge 42 of central panel 34 with a lower edge 44 of a side panel 32. Connecting panels 36 are preferably generally trapezoidal in shape, with the short side 46 of each connecting panel 36 abutting and connected to an edge 42 of central panel 34 and the long side 48 of each connecting panel 36 abutting and connected to the lower edge 44 of a side panel 32. Each nonparallel side 50 of each connecting panel abuts and is connected to an adjacent non-parallel side 50 of an adjacent connecting panel 36. Insulation panels 32, 34, 36 are preferably connected together to form a substantially continuous enclosure surrounding a lower portion of reactor vessel 4.

It will be appreciated that central panel 34 is not always necessary to enclose vessel 4 within insulation polyhedron 40. If no central panel 34 is provided, connecting panels 36 will be generally triangular in shape with the apex of the triangles meeting below a central portion of hemispherical portion 8 of reactor vessel 4 and the base of each triangle abutting the lower edge 44 of a side panel 32.

It will be appreciated that insulation 30, and in particular side panels 32, will occupy a portion of gap 20. However, a space, or gap, 52 will remain between each side wall 16 and each side panel 32. In a preferred embodiment, gap 52 is about 1 to 3 inches wide. The remainder of gap 20 which is not occupied by insulation 30 will be located between side panels 32 and reactor vessel 4. Gaps 20, 52 provides areas for cooling air to circulate around insulation 30.

In a preferred embodiment, the corners 54 of opening 12 in primary shield 10 and the corners 55 of polyhedron 40 form obtuse angles. In each corner 54 of opening 12, gap 20 is of sufficient size to accommodate reactor monitoring instrumentation, such as an excore detector 56, therein. Excore detectors 56 are used to monitor neutron emissions from reactor vessel 4. It will be appreciated that with this invention, excore detectors 56 may be positioned such that no insulation is disposed between detector 56 and reactor vessel 4. This results in improved performance of the excore detectors over that which can be achieved in existing designs. However, excore detectors 56 may be positioned in any desired location, with or without insulation 30 disposed between the detectors and reactor vessel 4.

Each excore detector 56 preferably includes a cylinder mounted on side wall 16 in a corner 54. Excore detectors 56 may be mounted in any or all corners 54 of opening 16. In a preferred embodiment, eight detectors 56 are provided, one in each corner 54.

Figure 4:
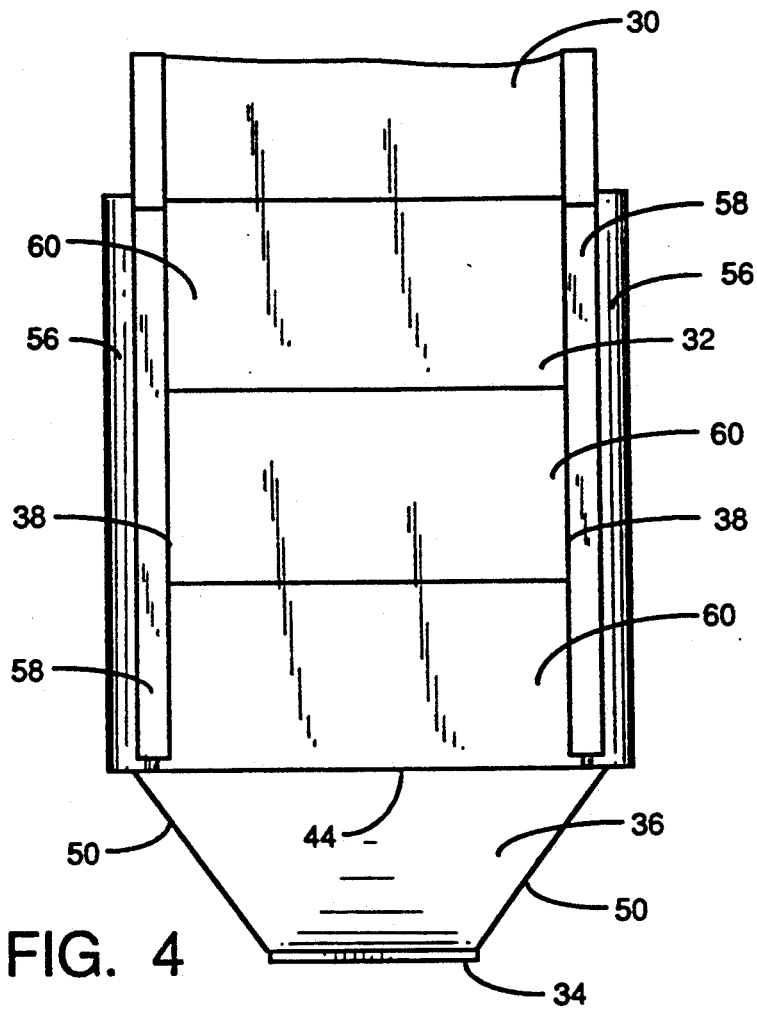
FIG. 4 is an elevational view of a portion of an embodiment of the reactor vessel insulation of this invention.
Figure 5:
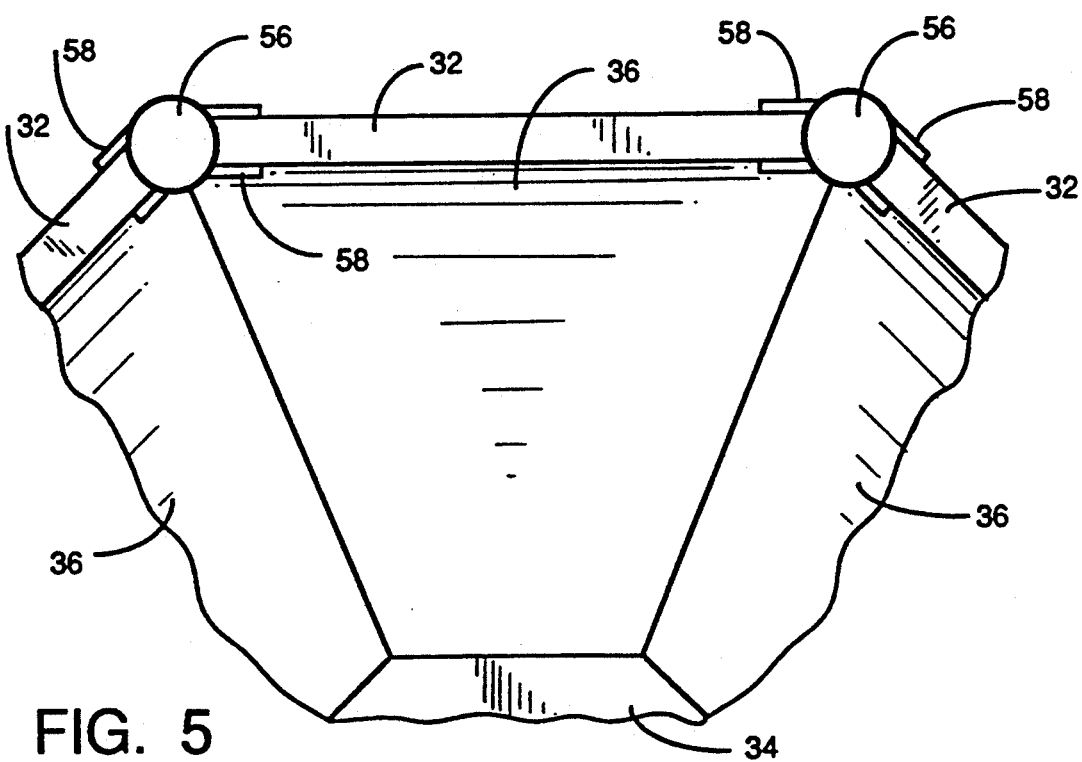
FIG. 5 is a top plan view of a portion of the reactor vessel insulation of this invention.

Referring to FIGS. 4 and 5, insulation panels 32, 34, 36 may be secured to vessel 4, side wall 16, the cylinders in which excore detectors 54 are mounted or to any combination thereof. For example, elongated, generally U-shaped tracks 58 may be mounted on the exterior of the cylinders in which the excore detectors 54 are mounted. Tracks 58 receive the edges of side panels 32 therein, whereby each panel may vertically slide into and out of position. Tracks 58 allow easy removal of the panel for maintenance and also simplify installation of the panels. Alternatively, it will be appreciated that insulation panels 32, 34, 36 may be permanently or removably mounted to at least one of vessel 4, side walls 16, and excore detectors 54 using any suitable means.

Bottom panel 34 and connecting panels 36 may be removably or permanently secured to any of side panels 32, reactor vessel 4, side walls 16, excore detectors 54 and tracks 58, in any suitable manner known to those skilled in the art.

To further aid in installation and removal of insulation 30, each side panel 32 may be composed of a plurality of vertically stacked sections 60, as best shown in FIG. 4. Each section 60 may be of a size such that it may be easily handled.

It will be appreciated that this invention may be utilized with a reactor vessel and primary shield of any desired dimensions by varying the sizes of the various elements. For example, to accommodate a larger diameter reactor vessel, the width of side walls 16 may be increased, along with the corresponding width of side panels 32, and the size of panel 34, and connecting panels 36.

Further, it will be appreciated that this invention provides a nuclear reactor wherein the space between the reactor vessel and the primary shield is increased in order to provide improved access for installation, removal and maintenance of thermal insulation and reactor monitoring instrumentation disposed therein, yet which does not require the reactor vessel supports to span additional distance in order to accommodate the increased space.

Whereas particular embodiments of this invention have been described for purposes of illustration, it will be evident to those skilled in the art that numerous variations in the detail may be made without departing from the invention as defined in the appended claims.

What is claimed is:

1. In a nuclear reactor having a primary shield and a generally cylindrical reactor vessel having a generally hemispherical lower end, said reactor vessel being disposed within an opening in said primary shield, said opening being defined by an inner surface, said reactor vessel being supported within said opening in said primary shield by a plurality of angularly spaced reactor vessel supports connected to said primary shield and on which said reactor vessel is supported, and reactor vessel thermal insulation disposed between said reactor vessel and said primary shield and surrounding a lower portion of said reactor vessel, wherein the improvement comprises:

said inner surface of said opening in said primary shield includes a plurality of generally planar side walls which form a polyhedral-shaped opening into which said reactor vessel is disposed; and said thermal insulation includes a plurality of slidably insertable and removable generally planar panels forming an insulation polyhedron surrounding at least said lower portion of said reactor vessel.

2. The nuclear reactor of claim 1, wherein
said insulation polyhedron has a shape which substantially corresponds to the polyhedral shape of said opening in said primary shield.

3. The nuclear reactor of claim 2, wherein
said polyhedral-shaped opening in said primary shield has a plurality of corners between said generally planar side walls; and
excore detectors are mounted in at least some of said corners such that said insulation is not disposed between said excore detectors and said reactor vessel.

4. The nuclear reactor of claim 3, wherein
each said side wall has a central portion adjacent to said reactor vessel;
said vessel supports are in communication with at least some of said side walls; and
each said reactor vessel support has a central portion which is aligned with and at least partially supported by said central portion of one said side wall and said reactor vessel engages and is supported by at least said central portion of each said reactor vessel support.

5. The nuclear reactor of claim 4, wherein said generally planar panels include a plurality of generally rectangular side panels oriented generally longitudinally with and surrounding said generally cylindrical portion of said reactor vessel, said side panels being disposed generally parallel to said side walls of said primary shield, a generally planar central panel disposed below a central portion of said hemispherical portion of said reactor vessel and oriented generally perpendicular to said side panels, said central panel having a plurality of generally linear edges oriented generally parallel to said side walls, and a plurality of generally planar, generally trapezoidal-shaped connecting panels connecting lower edges of said side panels to said edges of said central panel to form said insulation polyhedron.

6. The nuclear reactor of claim 5, wherein at least one of said generally planar panels is mounted on at least one of said excore detectors.

7. The nuclear reactor of claim 5, wherein
said opening in said primary shield includes eight said side walls which form a polyhedral-shaped opening having generally octagonal cross-sectional shape; and
said insulation polyhedral includes eight said side panels forming a polyhedron having a generally octagonal cross-sectional shape.

8. A method of thermally insulating a lower portion of a generally cylindrical reactor vessel of a nuclear reactor, said nuclear reactor further having a primary shield and reactor vessel supports, said reactor vessel further having a generally hemispherical lower end and being disposed within an opening in said primary shield, so as to provide space between said primary shield and said reactor vessel, comprising the steps of:

providing said primary shield having a generally polyhedral-shaped opening therein defined by a plurality of generally planar side walls;

supporting said nuclear vessel said opening in said primary shield with the reactor vessel supports;

surrounding at least a lower portion of said reactor vessel with a plurality of generally planar insulation panels such that said panels form an insulation polyhedron substantially enclosing said lower portion of said reactor vessel; and mounting said panels for sliding into and out of position around said vessel.

9. The method of claim 8, further including
surrounding said generally cylindrical portion of said reactor vessel with a plurality of generally rectangular side panels of insulation, providing a generally planar central insulation panel below said hemispherical end of said reactor vessel and oriented generally perpendicular to said side panels, and connecting said side panels to said central panel with a plurality of generally trapezoidal-shaped connecting panels of insulation to form said insulation polyhedron.

10. The method of claim 9, further including
providing eight said generally planar side walls to define a generally polyhedral-shaped opening having a generally octagonal cross-section; and
providing at least eight said side panels of insulation to form an insulation polyhedron having a generally octagonal cross-section.

* * * * *